United States Patent
Delafoy et al.

(10) Patent No.: US 9,053,830 B2
(45) Date of Patent: Jun. 9, 2015

(54) PENCIL COMPRISING A STACK OF OXIDE NUCLEAR FUEL PELLETS

(75) Inventors: Christine Delafoy, Lyons (FR); Pascal Deydier, Genas (FR)

(73) Assignee: AREVA NP, Courbevoie (FR)

( * ) Notice: Subject to any disclaimer, the term of this patent is extended or adjusted under 35 U.S.C. 154(b) by 318 days.

(21) Appl. No.: 10/433,229

(22) PCT Filed: Nov. 27, 2001

(86) PCT No.: PCT/FR01/03746
§ 371 (c)(1),
(2), (4) Date: Oct. 22, 2003

(87) PCT Pub. No.: WO02/45096
PCT Pub. Date: Jun. 6, 2002

(65) Prior Publication Data
US 2004/0047445 A1     Mar. 11, 2004

(30) Foreign Application Priority Data
Nov. 30, 2000  (FR) ..................... 00 15506

(51) Int. Cl.
*G21C 3/00*     (2006.01)
*G21C 21/02*    (2006.01)
(52) U.S. Cl.
CPC ........... *G21C 21/02* (2013.01); *G21Y 2002/104* (2013.01); *G21Y 2002/303* (2013.01); *G21Y 2004/30* (2013.01); *G21Y 2004/40* (2013.01)

(58) Field of Classification Search
USPC .......... 376/420, 426, 428, 433, 901; 252/638; 264/10.5
See application file for complete search history.

(56) References Cited

U.S. PATENT DOCUMENTS

| | | | |
|---|---|---|---|
| 4,804,516 A | | 2/1989 | Thomazet et al. |
| 4,885,147 A | * | 12/1989 | Murakami et al. ............ 423/261 |
| 5,268,947 A | * | 12/1993 | Bastide et al. ................ 376/422 |
| 5,844,958 A | | 12/1998 | Leroux et al. |
| 5,894,501 A | | 4/1999 | Doerr et al. |
| 5,999,585 A | | 12/1999 | Dehaudt et al. |
| 6,669,874 B1 | * | 12/2003 | Abry et al. .................... 252/636 |

FOREIGN PATENT DOCUMENTS

| | | | |
|---|---|---|---|
| EP | 0 246 962 | 11/1987 | |
| FR | 2 706 066 A | 12/1994 | |
| FR | 00 15507 | 5/2002 | |
| JP | 64-29796 | 1/1989 | |
| WO | 94 29874 | 12/1994 | |
| WO | 95 18451 | 7/1995 | |
| WO | WO 00-49621 A1 * | 8/2000 | ............... G21C 3/62 |

OTHER PUBLICATIONS

*KSR International Co.* v. *Teleflex Inc. et al.* Supreme Court of the United States. No. 04-1350. Decided Apr. 30, 2007. Syllabus, pp. 1-7.*

(Continued)

*Primary Examiner* — Jack W Keith
*Assistant Examiner* — Marshall O'Connor

(57) ABSTRACT

The rod contains substantially cylindrical oxide nuclear fuel pellets based on enriched uranium oxide. The H/D ratio of the height over the diameter of the pellets lies in the range 0.4 to 0.6. The initial diametral clearance between the pellets and the cladding does not exceed 200 μm.

2 Claims, 2 Drawing Sheets

(56) References Cited

OTHER PUBLICATIONS

Vaz et al, "Grain size distribution: the lognormal and the gamma distribution functions", Scripta Metallurgica, v. 22, pp. 35-40, 1988.*
Bourgeois et al., "Pore migration in UO2 and grain growth kinetics", Journal of Nuclear Materials, vol. 295, pp. 73-82 (2001).*
Paraschiv et al, "On the fission gas release from the oxide fuels during normal grain growth", Journal of Nuclear Materials 246, 223-231 (1997), Elsevier Science, B.V.*
Bourgeois, L., "Contribution to the study of the role of doping agents in the densification and crystal growth of uranium dioxide", pp. 1 and 96-101, Translation by the USPTO into English of pp. 1 , 96-101 of "Contribution a l'etude du role de dopants dans la densification et la croissance cristalline du dioxide d'uranium" CEN/Grenoble, Jun. 1992.*
Killeen, J.C., Fission Gas Release and Swelling in Uo2 Doped With Cr2o3, Journal of Nuclear Materials 88 (1980) 177-184.
Thesis: Peres, Véronique, Contribution A L'etude De La Dispersion De Particules De Phases Secondaires Dans Le Dioxyde D'uranium Polycristallin, de I'Institut National Polytechnique De Grenoble, Dec. 17, 1993, 1-226.
Thesis: Bourgeois, Laurent, Contribution A L'etude Du Role De Dopants Dans La Densification Et La Croissance Cristalline Du Dioxyde D'uranium, de I'lnstitut National Polytechnique De Grenoble, Jun. 17, 1992, 1-144.
Thesis: Vivant-Duguay,Christelle, Contribution A L'etude Du Fluage Du Dioxyde D'Uranium Role Des Activateurs De Croissance Cristalline, Devant L'Institut National Des Sciences Appliquees De Lyon, Jan. 1998, 1-226.
Database WPI Section Ch, Week 197916 Derwent Publications Ltd., London, GB; AN 1979-30439B XP002174666 & JP 54 031895 A (Nippon Atomic Ind Group Co Ltd), Mar. 8, 1979 Abstract.
E.N. Bunting, "Phase Equilibria in the System $Cr_2O_3$—$Al_2O_3$", Bur. Standards J. Research 6(6): 948 (1931): R.P. 317.
A.M. Alper et al., "Phase Equilibria in the System MgO—$MgCr_2O_4$", J. Am. Ceram. Soc. 47 (1) 30-33. (1964).
Patent Abstracts of Japan vol. 1999, No. 12, Oct. 29, 1999 & JP 11 202073A (Toshiba Corp), Jul. 30, 1999 Abstract.
Patent Abstracts of Japan vol. 018, No. 356 (P-1765), Jul. 5, 1994 & JP 06 094868 A (Nippon Nuclear Fuel Dev Co Ltd), Apr. 8, 1994 Abstract.
Patent Abstracts of Japan vol. 1995, No. 01 Feb. 28, 1995 & JP 06 281774 A (Nuclear Fuel Ind Ltd), Oct. 7, 1994 Abstract.
Patent Abstracts of Japan vol. 018, No. 541 (P-1813) Oct. 14, 1994 & JP 06 194480A (Nippon Nuclear Fuel Dev Co Ltd), Jul. 15, 1994 Abstract.
Patent Abstracts of Japan vol. 003, No. 101 (M-070), Aug. 25, 1979 & JP 54 074985A (Toshiba Corp; Others: 01), Jun. 15, 1979 Abstract.
U.S. Nuclear Regulatory Commission Standard Review Plan, Rev. 3, Mar. 2007.

* cited by examiner

PENCIL COMPRISING A STACK OF OXIDE NUCLEAR FUEL PELLETS

FIELD OF THE INVENTION

The invention relates to the nuclear fuel used in reactors cooled and moderated by water.

BACKGROUND INFORMATION

Nuclear fuel in water reactors is in the form of sintered pellets that are approximately cylindrical in shape, and that are based on uranium oxide enriched in isotope 235 and/or in plutonium. The fuel may also include a neutron poison and/or a small percentage of metals or oxides for causing grains to grow during sintering and for increasing fission gas retention as provided in WO-A-94/29874. The fuel is used in the form of a stack of pellets in a cladding of zirconium-based alloy for making up fuel rods or elements. Such rods are mounted in a skeleton in order to constitute a fuel assembly. In general, the skeleton comprises two nozzles interconnected by tubes which carry grids for holding the rods at the nodes of a regular array. Assemblies of this type are described, for example, in U.S. Pat. Nos. 5,844,958 and 4,804,516, to which reference can be made.

An imperative in the design of pellets and rods is safety. For economic reasons, it is desirable to lengthen, as much as possible, the time fuel rods remain in a reactor and to reduce the cost of manufacturing pellets. An important factor limiting the operating flexibility of a reactor is the increasing risk of the cladding failing due to mechanical stress caused by interaction between the pellets and the cladding, referred to by the abbreviation PCI (for pellet/cladding interaction).

At present, quasi-cylindrical pellets having a height greater than their diameter have been adopted almost universally. By way of example, pellets that are presently in widespread use have a diameter D of about 358.2 millimeters (mm) and a height H of 13.4 mm, which corresponds to an H/D ratio of about 1.6. Relatively large diametral clearance of about 170 micrometers (μm) is provided between the pellets and the cladding in order to reduce PCI, and recesses are provided in the end faces of the pellets, with such end faces also being chamfered.

Proposals have also been made, as provided in Japanese Patent Application No. JP-A-54 07 4985 for nuclear fuel rods in which the pellets and the cladding are dimensioned in such a manner that the pellets have a height/diameter ratio of less than 0.7, and simultaneously the diagonal of the pellet is less than the sum of the diameter plus the radial clearance, which gives rise to a large amount of radial clearance, thereby constituting an obstacle to heat transfer.

SUMMARY

The invention seeks in particular to provide rods containing a stack of nuclear fuel pellets that satisfy practical requirements better than previously designed rods, in particular concerning the circumferential stresses that are due to PCI, which stresses are considerably reduced, even for the same initial value of diametral clearance between the pellets and the cladding.

For this purpose, the invention proposes a nuclear fuel rod comprising cladding of zirconium-based alloy and a stack of nuclear fuel pellets in which the ratio H/D of height over diameter lies in the range 0.4 to 0.6, and may be, for example, about 0.5, the initial diametral clearance between the pellets and the cladding not exceeding 200 μm.

The value of 200 μm is not exceeded since this would degrade heat transfer, particularly at the beginning of irradiation, and there would be an increase in the release of fission gas.

The minimum acceptable clearance can be smaller than is possible with "long" pellets because of the improvement in terms of cladding stress that is obtained by using "short" pellets. Taking account of inevitable manufacturing tolerances, it can be estimated that a nominal clearance of 135 μm constitutes a minimum.

It has been found that such a rod allows, at high powers, reduction of circumferential stresses in the cladding to a very considerable extent.

A systematic study has shown that, other things being equal, circumferential stresses continue to decrease for H/D ratios of less than 0.4 and that the improvement in Tresca stress (circumferential stress minus radial stress) continues to increase. However difficulties of industrial implementation are to be expected when the ratio H/D is less than 0.4.

At least in pressurized water reactors, the pellets present dishes, generally in the shape of spherical caps, to compensate for the effects of differential expansion that appear on pellet radius during transients.

The diameters of the dishes in the end faces may be the same as those used in "long" pellets. The diameter of the dish must leave sufficient contact area between two stacked-together pellets. For a pellet having a diameter of 8.192 mm, it is possible to use a dish having a diameter of 4.72 mm, when the pellet presents a chamfer over a width of 0.42 mm. A reduction in the depth of the dishes in fixed proportion to the reduction in height is unfavorable for H/D ratios in the range 0.4 to 0.6. It is advantageous for depth to be increased for a H/D ratio lying in the range 0.4 to 0.6.

In some cases, it is even possible to dispense with the step of grinding the pellet, which represents a significant economic advantage, in particular by eliminating grinder sludge and simplifying manufacture.

The initial clearance that does not exceed 200 μm takes account of heat transfers between pellets and the cladding. The initial nominal diameter of the pellets may be the same as that commonly specified at present, being about 8.192 mm. Small initial clearance may be accepted if the pellets are ground, since that reduces dispersion between the mean diameters of the various pellets and the difference between the maximum and minimum diameters of a single pellet.

Loading is made easier if there are chamfers at the peripheries of the end faces. Finally, it has been found that changing from a pellet of height that is much greater than its diameter to a pellet of height that is close to half its diameter does not give to unacceptable loss of strength.

In general, using short pellets with the maximum clearance specified above reduces pellet/cladding interaction (PCI), in particular because of an instantaneous reduction in pellet expansion during power transients (reduction in pincushion deformation) even for very high speed transients. Since the difference in shape between the midplane and the interpellet plane is small, there is a reduction in radial deformation of the cladding, or a reduction in the stresses and in the consequences of PCI. As a result, a rod is obtained with increased margins in terms of maneuverability. To a first order, this effect depends only on the variation in fuel temperature during a transient (induced by the power variation) and not on the mean temperature of the pellets during the transient.

In an exemplary embodiment, the pellets contain an additive constituted by a metal oxide activating crystal growth and increasing viscoplasticity by encouraging high temperature creep and retaining fission gases. Such pellets may be used regardless of the H/D ratio, and in particular when the ratio lies in the range 0.5 to 1.6.

Amongst usable additives, particular mention can be made of $Cr_2O_3$, $SiO_2$, $Nb_2O_5$, and $Al_2O_3$, in isolation or in combination.

$SiO_2$ at a concentration of 100 parts per million (ppm) to 300 ppm improves creep by forming a viscous phase which facilitates slip at the grain boundaries, but $SiO_2$ does not have a favorable effect on grain size, which it is desirable to increase in order to slow down fission gas release. In addition, when used on its own it makes the pellets weaker. When associated with 1200 ppm to 2000 ppm of $Cr_2O_3$, $SiO_2$ at a concentration of up to 200 ppm has an effect that is favorable.

$Al_2O_3$ can be used only at low concentration, of the order of 75 ppm, corresponding to its solubility limit in $UO_2$ at sintering temperature. It then has a favorable effect on rate of creep. However, the need for accurate control over concentration makes manufacture more complicated. $Al_2O_3$ at a concentration of up to 100 ppm can be added to a concentration of 1200 ppm to 2000 ppm of $Cr_2O_3$.

Studies have been performed which show that introducing $Cr_2O_3$ in the $UO_2$ powder (possibly including a fraction of $PuO_2$) at an initial concentration that leads to a concentration in the sintered pellets lying in the range 1250 ppm to 2000 ppm presents a particular advantage of increasing creep at the temperatures and stress levels encountered in operation in fuel rods and increases the viscoplasticity of the sintered product, thus reducing the thrust applied by the pellets to the cladding during power transients.

The addition of certain oxides or of certain metals allows grain growth.

In particular, at concentrations above 750 ppm, $Cr_2O_3$ causes an increase in grain size. Above 1500 ppm, grain size increases in quasi-exponential manner. The final concentration should be selected to lie in the range 1200 ppm to 2000 ppm. It is advantageous to adopt a final concentration of 1600±150 ppm, since below that grain growth is limited, and above a final concentration of 1750 ppm, the dopant evaporates strongly in the sintering oven and there is no significant improvement in creep behavior.

In practice, a concentration of about 1600 ppm is used since that is favorable simultaneously to improving creep and to increasing grain size.

In order to obtain optimum characteristics when the pellets contain a doping additive, and in particular $Cr_2O_3$, it is desirable to perform sintering under conditions that do not run any risk of returning $Cr_2O_3$ to the metal state, in spite of the fact that conventional sintering ovens do not admit an oxidizing atmosphere. In practice, the processing of green pellets generally comprises pre-sintering at temperature in a dry hydrogen atmosphere, or in any atmosphere including a very small fraction of water vapor, and sintering at a maximum temperature lying in the range 1700° C. to 1750° C. in a hydrogen atmosphere having 1.9% to 2.5% by volume of water vapor in the sintering zone, which may lead to as much as about 3% water vapor at the entrance to a continuous sintering oven.

In an embodiment, the sintered pellet is substantially cylindrical in shape with dishes and chamfers. Nevertheless, it is possible to adopt a barrel shape giving the pellet a diameter in its midplane that is several tens of microns greater than the diameter of its end faces in order to counterbalance pincushion-deformation. It is also possible to use a very slightly conical shape when there are variations of density along a pellet.

The end faces may include dishes in the form of spherical caps, and/or chamfers.

BRIEF DESCRIPTION OF THE DRAWINGS

The above characteristics, and others, are described in the following description of particular embodiments, given as non-limiting examples.

DETAILED DESCRIPTION

Figure 2:
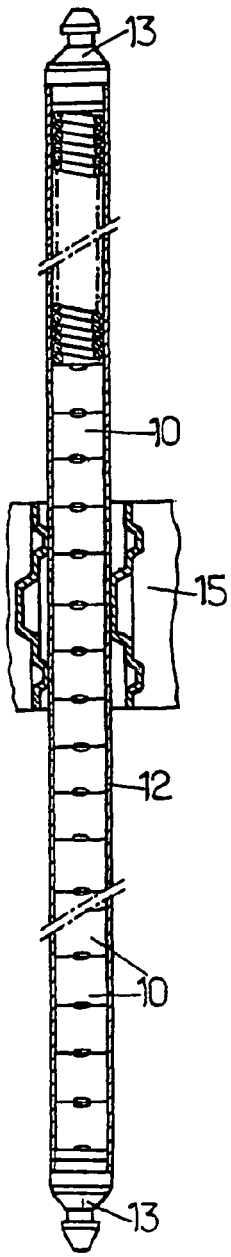
FIG. 2 is a diagrammatic section view of a segment of a fuel rod.

The pellets 10 that were studied were made of lightly enriched uranium oxide; they were for insertion into cladding 12 of zirconium-based alloy having a thickness of 0.57 mm and a nominal inside diameter of 8.36 mm; cladding 12 was used in particular of the type illustrated in FIG. 2, closed by end plugs 13 each presenting a frustoconical end nozzle and a handling groove. In a fuel assembly, rods thus constituted are generally held in place by grids 15 belonging to the skeleton and provided with rod-holding dimples and/or springs. A fragment of such a grid is illustrated diagrammatically in FIG. 2.

The comparison made below corresponds to pellets that were ground. All the pellets had a mean diameter D of 8.192 mm. It is recalled that standard pellets have a ratio H/D=1.64. Irregularities in diameter (of less than 30 μm) observed on non-ground pellets have no significant influence on the advantage of the concept of a very short pellet.

The last two values were taken into account only for pellets of the invention having a value of H/D=0.5. For standard pellets, only the usual value was used.

Most of the pellets were compressed and sintered, and then ground under conditions suitable for giving them a cylindrical shape; it is also possible to use the method described in French Published Patent Application No. 00/15507 entitled [in translation] "A method of manufacturing oxide nuclear fuel pellets", to which reference may be made.

Figure 1:
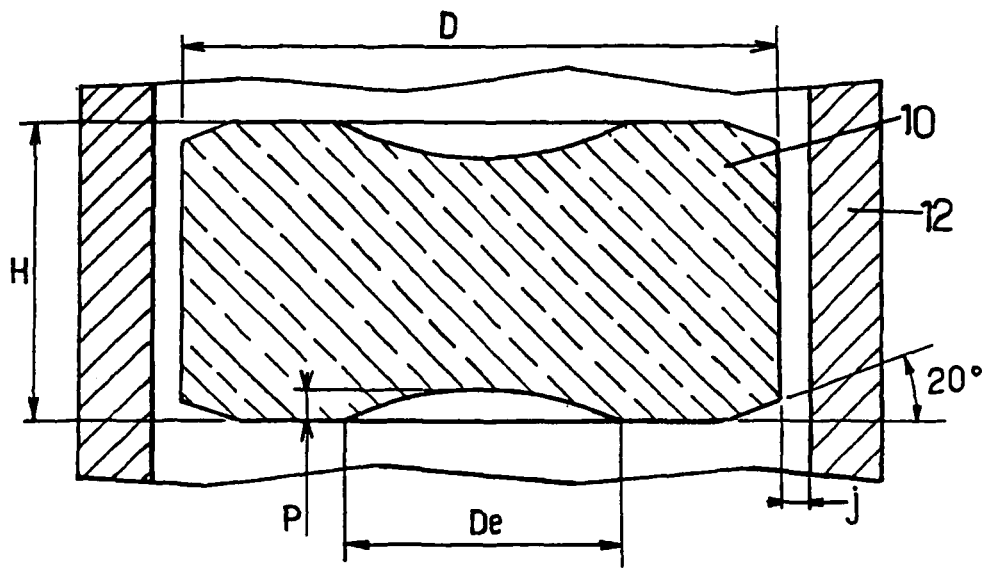
FIG. 1 is a section view showing the dimensional parameters of a nuclear fuel pellet and of cladding.
Figure 3:
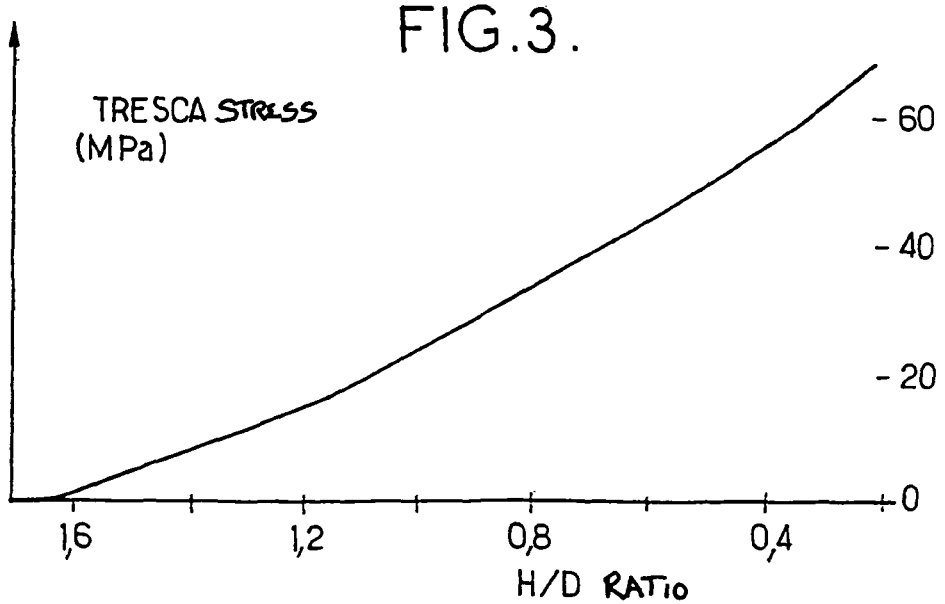
FIG. 3 is a graph of varying Tresca stress as a function of the H/D ratio for pellets having the same dish in cladding loaded with pellets of conventional type and with ground pellets of the invention.

A comparison was made between radial and circumferential stresses computed by simulation in the zone of the cladding which is generally critical, i.e. in the plane inside the cladding, in the inter-pellet plane. A series of tests led to the curve given in FIG. 3. This curve shows the improvement in Tresca stress as a function of the H/D ratio for power dissipation of 424 watts (W) per centimeter length of the rod, compared with cylindrical pellets of conventional type, having an H/D ratio of 1.64, and both having the same dish of 0.32 mm.

The improvement in stress can be close to 50 megapascals (MPa) for H/D=0.5, thus making it possible to increase the acceptable transient power without reaching the value lying in the range 460 MPa to 495 MPa which is generally considered as being a stress limit not to be exceeded in the cladding. It is thus possible to improve the operating flexibility of commercial reactors and to respond quickly to any instantaneous electricity demand from the grid.

To summarize, and although circumferential stress continues to decrease above an H/D value of 0.5, the value of 0.5 seems to be close to the optimum, when account is taken of other parameters, such as pellet weakness and the risk of fractioning.

A pincushion shape has also been investigated. It has been found that it has no significant influence. The presence of a cylindrical fraction at the ends makes it possible to reduce the bearing angle against the cladding. For pellets having an H/D ratio of 0.5, and for a dish of the same depth, a difference of about 20 µm between the radius of the end faces and the minimum radius ought not to be exceeded in general.

The observed variations in diameter (<30 µm) on pellets that have not been ground have no significant influence on the advantage of this pellet design.

The following conclusions can be drawn from the set of results obtained.

Decreasing the H/D ratio provides a significant improvement from the point of view of stress, because of various phenomena and in particular because this reduction reduces geometrical deformation of pincushion shape as caused by the temperature difference between the center of the pellet and its periphery. For uranium dioxide pellets having a diameter close to the usual value of 8.192 mm, a value of H/D=0.5 represents a satisfactory compromise between reducing stresses, manufacturing possibilities, and weakening; because of the reduction in stresses, it often makes it possible to use pellets that have not been ground, and that are therefore less expensive.

The depth p of the dishes should generally lie in the range 0.013 H to 0.052 H. It is possible to retain the value p=0.32 mm that is commonly used at present for D=8.192 mm.

As mentioned above, the presence of doping additives in green pellets, and in particular of chromium oxide $Cr_2O_3$, combined with a sintering technique that encourages grain growth, makes it possible to increase the creep of sintered pellets and also their plasticity, and thus to decrease PCI.

In practice, the influence of $Cr_2O_3$ on the creep behavior and on the growth in grain size of $UO_2$ during sintering involves various mechanisms that had to be identified in order to reach an optimum result.

Creep behavior, studied at temperatures lying in the range 1400° C. to 1600° C. under stresses lying in the range 30 MPa to 60 MPa shows a strong incidence of the form of $Cr_2O_3$ in the $UO_2$ matrix and of grain size, with an improvement in all cases that can be as great as a factor of 10, and in general an improvement in creep which is optimum for values close to 1500 ppm when $Cr_2O_3$ is used on its own.

Grain growth for concentrations of up to 1500 ppm reveals almost complete solubilization of $Cr_2O_3$ in $UO_2$, and an activation of crystal growth that corresponds to an increase in the diffusion coefficient of $U^{4+}$ in $UO_2$ making it possible to reach a grain size of about 40 µm for optimum sintering conditions with a maximum sintering temperature of about 1750° C. At higher concentrations, the increase in grain boundary mobility due to the increase in the intergranular quantity of $Cr_2O_3$ gives rise to rapid change in grain size leading to a size greater than 40 µm.

The search for a concentration that is optimum from the point of view of grain size and of fission gas retention ability needs, nevertheless, to take account of the technology of industrial sintering ovens and of the fact that the optimum is not necessarily the same as the optimum for creep. At present, ovens use reducing atmospheres since they include elements that are oxidizable. As a result, sintering is performed under a hydrogen atmosphere, in association with water vapor in order to increase the oxygen potential of the atmosphere and to encourage the action of the dopant. A maximum water vapor concentration of 5% by volume that is acceptable in ovens, enables an oxygen potential to be obtained of about:
 −500 kilojoules per mole (kJ/mol) when cold, which can reach −350 kJ/mol at 2000° C.

A comparison with the oxygen potential that corresponds to $Cr/Cr_2O_3$ equilibrium illustrates that $Cr_2O_3$ is reducible into chromium from 1000° C. under a hydrogen atmosphere having 0.0005% water vapor, but only from 1500° C. under a hydrogen atmosphere with 1% water vapor, and that $Cr_2O_3$ is stabilized in the range 1700° C. to 1750° C. above 2.5% water vapor.

Furthermore, above 1750 ppm of $Cr_2O_3$ in green pellets leads to a high degree of evaporation during sintering which makes it difficult to exceed a final overall concentration of 1800 ppm in the sintered pellet.

In order to be satisfactory, sintering requires temperature to rise to about 1750° C. locally (in a continuously-operating oven). As mentioned above, the atmosphere which necessarily varies along the oven, must not reduce $Cr_2O_3$ to the metal state which does not have a beneficial effect.

Figure 4:
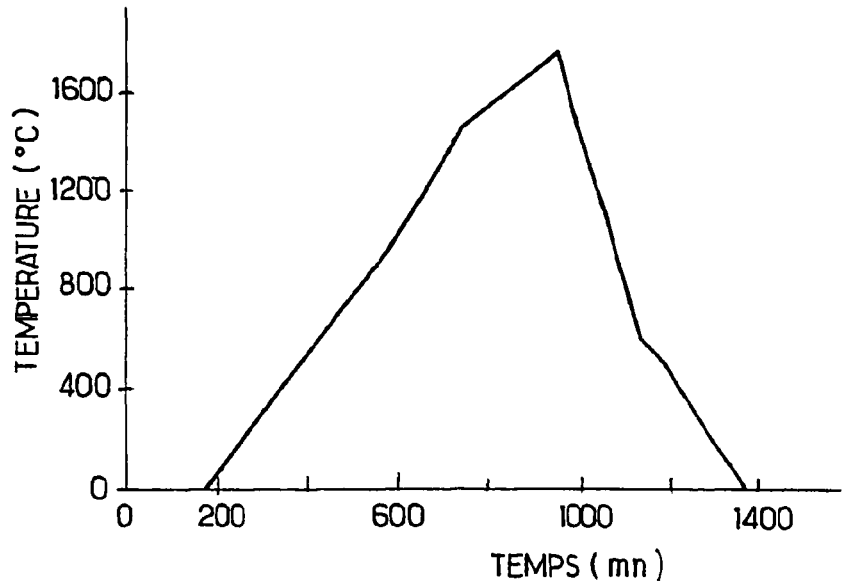
FIG. 4 is a typical temperature profile in a continuously-operating oven.

In an oven having five successive heating zones, it has been found that the sintering cycle illustrated in FIG. 4 gives good results.

The first two zones are for pre-sintering and for eliminating the additives (in particular organic additives) added to the $UO_2$ powder in order to improve the characteristics of the final product (strength, appearance, structure). The rise in temperature from 1500° C. to 1750° C. takes place slowly (e.g. at about 80° C. per hour (C/h)) in order to encourage grain growth.

Figure 5:
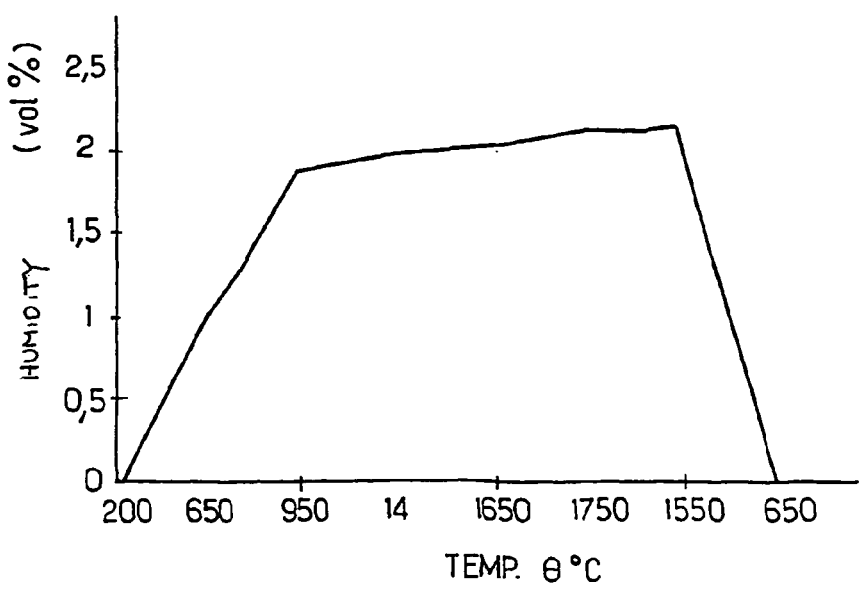
FIG. 5 is a typical profile for humidity as a function of temperature to be complied with in an oven.

The humidified gas is normally introduced into the oven only in the sintering zone, so the composition of the atmosphere varies along the oven. A profile of variation in humidity of the type illustrated in FIG. 5 gives good results during sintering proper, with the humidification of the atmosphere on average being 1.9 vol. % of $H_2O$.

Tests have also been performed with increased concentrations of dopants or with combinations of dopants, adding $SiO_2$ and/or $Al_2O_3$ to the $Cr_2O_3$, and in particular:
 2000 ppm $Cr_2O_3$
 2000 ppm $Cr_2O_3$+50 ppm to 200 ppm $SiO_2$
 2000 ppm $Cr_2O_3$+100 ppm $SiO_2$+ up to 100 ppm $Al_2O_3$
 1000 ppm $Cr_2O_3$+50 ppm to 200 ppm $SiO_2$
 1800 ppm $Cr_2O_3$+50 ppm to 200 ppm $SiO_2$
 1500 ppm $Cr_2O_3$+100 ppm $SiO_2$ Those tests confirm that a concentration of $Cr_2O_3$ exceeding 1750 ppm does not lead to sufficient advantages to compensate for the difficulties associated with evaporation and if $Si_2O_3$ and $Al_2O_3$ at very low concentration enable the action of the $Cr_2O_3$ to be perfected.

In general, doping the pellet makes it possible to envisage the material creeping into the dishes, particularly in the context of very high-power transient situations under the highest stresses. Such creep also makes it possible to reduce the thrust of the pellet on the cladding at the inter-pellet planes, thereby reducing stresses on the cladding and giving greater margins with respect to PCI stresses. Overall, the pellets constitute a remedy against PCI and thus open up a vast range of situations. In particular, doping with 0.16% by weight of $Cr_2O_3$ gives a large grain microstructure suitable for better retention of fission gases, thus making it possible to achieve greater flexibility in the dimensioning of a fuel rod for high rate management.

What is claimed is:

1. A sintered pellet of oxide nuclear fuel, the pellet being substantially cylindrical and based on enriched uranium oxide, wherein the pellet contains from 1450 to 1750 ppm of $Cr_2O_3$ which has not been reduced during sintering of the pellet and wherein a grain size of $UO_2$ is equal to or greater than 40 μm, wherein the fuel does not contain plutonium dioxide.

2. The sintered pellet according to claim 1, wherein the pellet contains more than 1500 ppm of $Cr_2O_3$.

\* \* \* \* \*